Figure 1:
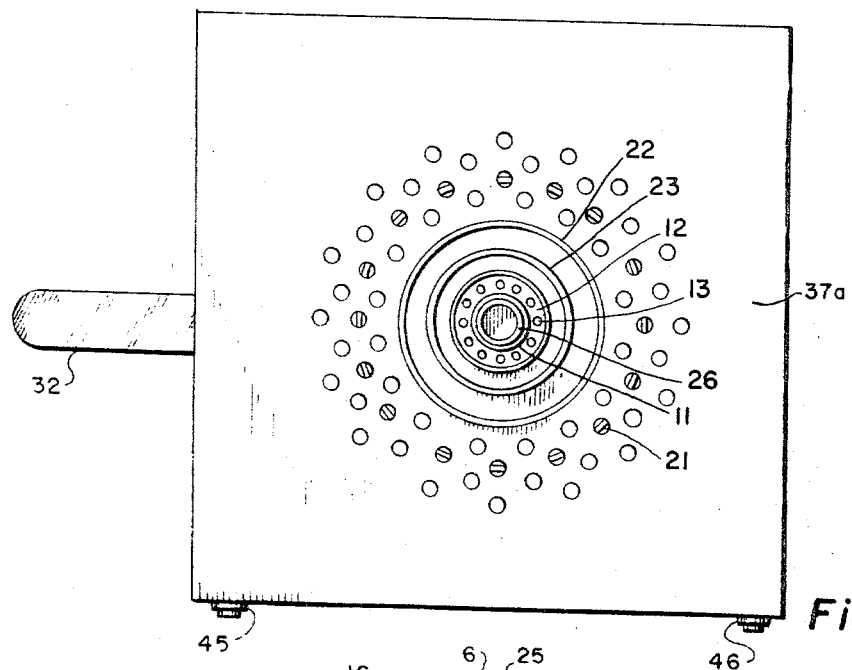

Nov. 2, 1965   R. W. EMUS   3,214,882
PACKAGING METHODS AND APPARATUS
Filed Nov. 30, 1962   2 Sheets-Sheet 1

United States Patent Office 3,214,882
Patented Nov. 2, 1965

3,214,882
PACKAGING METHODS AND APPARATUS
Ronald Wilbur Emus, Greenville, S.C., assignor to W. R. Grace & Co., Cambridge, Mass., a corporation of Connecticut
Filed Nov. 30, 1962, Ser. No. 241,336
11 Claims. (Cl. 53—42)

This invention relates to methods and apparatus for heat shrinking biaxially oriented polymer films. In particular, the invention relates to methods and apparatus for heat shrinking such films to form a protecting cover over the open side of a container.

Various methods and means for forming shrink covers over the open side of trays, dishes, pie plates, jars, milk bottles, etc., have previously been proposed. All known methods require relatively expensive and cumbersome procedures and equipment. In addition, problems have occurred when the container to be covered is composed of heat-sensitive thermoplastic materials, e.g., polystyrene, polyvinyl chloride, and the like. In these latter situations the heat required to shrink the heat-shrinkable thermoplastic films over the container is sufficient to mar, distort and occasionally destroy the plastic container.

It is an object of this invention to provide greatly simplified and relatively very inexpensive methods and apparatus for forming a protective cover over the open side of a container.

Another object of the invention is to provide methods and apparatus for forming a protective cover over the open side of heat-sensitive (e.g., polystyrene) containers without damaging the container in any way.

Still another object is to provide methods and appartus for forming shrink covers in which high "mounding" of product presents no problems.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are attained in the manner subsequently described utilizing high shrink energy biaxially oriented thermoplastic films. The term "high shrink energy" as used herein means a shrink energy of at least about 100 pounds per square inch. As is known to the art shrink energy is the measurable tension produced in a fully mono directionally restrained strip of film when heated to a given temperature. Sometimes this property is called shrink tension.

A representative example of high shrink energy biaxially oriented film is irradiated biaxially oriented polyethylene film, which is the film preferably used in practicing the invention.

Figure 2:
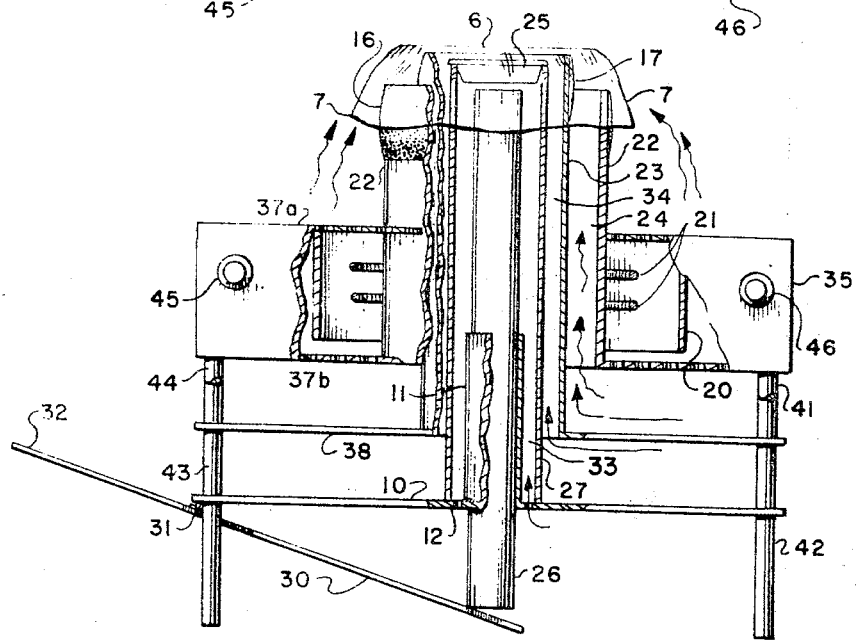
Figure 3:
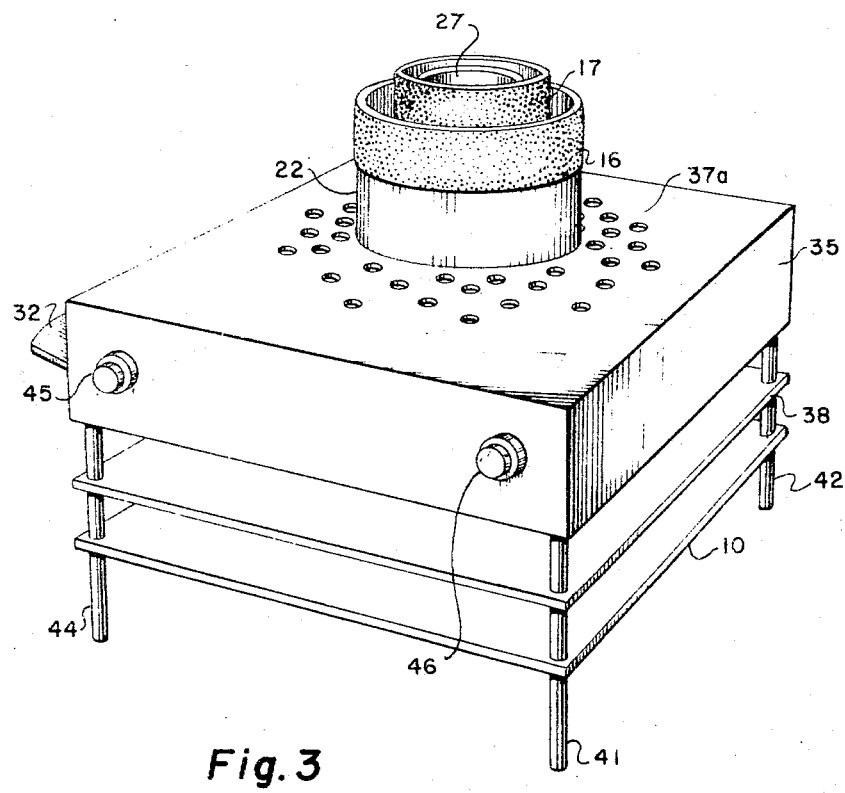

The invention will be described with reference to the accompanying drawings, in which:

FIGURE 1 is a plan view of apparatus embodying the invention;
FIGURE 2 is a front elevation of the apparatus of FIGURE 1, partially broken away and in cross-section;
FIGURE 3 is a perspective view of the apparatus shown in FIGURES 1 and 2.

In the apparatus illustrated in the drawings, there are heating means 21 enclosed within the space bounded by tubes 35 and 22. Tube 35 also forms a part of the outer framework of the apparatus as is best seen in FIGURE 3. Preferably there is also provided a baffle 20 exteriorly of and completely surrounding the heating means. Although not absolutely necessary, it is usually desirable to cover the top and bottom of the space in which the heating means lie with perforated metal plates, grids or other like means. These are designated as 37a and 37b in the drawings. The bottom of tube 22 is attached to and supported by the bottom grid 37b.

Tube 23, supported by shelf 38, is placed inside of and concentric to tube 22. Shelf 38 is spaced from the grid 37b to permit flow of gas e.g., atmospheric air through the grid 37b, past heating means 21 and out of top grid 37a. This spacing also permits flow of air or other gas through the annular space 24 between the walls of tubes 22 and 23. Another tube 27 is placed inside of and concentric to tube 23 forming an annular space 34 therebetween. Tube 27 is supported by shelf 10 which is spaced below shelf 38, permitting flow of air or other gas through annular space 34. The tube 27 is constructed with a cross-section into which container 25 will fit loosely, and in which the container will be restrained from any significant lateral shifting in any direction.

At the bottom and inside of tube 27 there is fixed a guide sleeve 11. The plate 12 which supports the guide sleeve has perforations, e.g., holes 13 (see FIGURE 1), which permit flow of air or other gas into the interior of tube 27.

Mounted for reciprocal motion inside the guide sleeve is a push rod 26 suitably a hollow cylinder which, when in normal rest position on inclined arm 30, also permits air flow into the interior of tube 27. The arm 30 is pivotally connected (e.g. by hinge 31) to bottom shelf 10 and has a lever arm extension 32 extending beyond the pivotal connection. Supporting legs, e.g., 41, 42, 43, 44, etc., are provided, as necessary, to give a unitary, substantially rigid overall structure. Usually heating means 21 comprise electric resistance heaters, in which case suitable control means such as rheostats 45 and 46 are provided.

It is known that certain heat shrinkable biaxially oriented thermoplastic films—irradiated, biaxially oriented polyethylene film for example—tend to adhere to other materials when hot. As previously stated irradiated biaxially oriented polyethylene film is the preferred high shrink energy, heat shrinkable biaxially oriented film in the present invention. It is necessary therefore to provide a roughened surface on at least the upper portions of the outer surface of tubes 22 and 23 (of the device shown in FIGURES 3 and 4) to prevent adherence thereto of hot thermoplastic film which shrinks into contact therewith. Suitable methods for providing this roughened surface include (but are not limited to) sand blasting, sanding with emery paper, and other like surface grinding methods. An especially good method of roughening the tube surface comprises placing thereon a thin layer of a refractory ceramic coating, e.g., a coating of aluminum oxide, chromium oxide, magnesium oxide, silicon oxide, zirconium oxide, titanium oxide or other like material. The preferred refractory ceramic coating is aluminum oxide. In the illustrated device a coating of aluminum oxide ($Al_2O_3$) is shown at 16 (tube 22) and 17 (tube 23).

In operation of the illustrated apparatus, heating means 21 are first energized, thus heating atmospheric air or other gas in the ambient atmosphere surrounding these means. This creates a natural convection flow of heated gas upwardly through grid or perforated plate 37a. A container, e.g., a polystyrene tray 25, is placed inside tube 27 and is held thereby at a height where its open side is slightly above to slightly below tube 23 and its bottom portion is slightly above push rod 26. A sheet 6 of heat shrinkable high shrink energy biaxially oriented thermoplastic film is draped over the top of the container. The sheet is large enough to have trailing edges 7 around its entire periphery hanging down over the outside of tube 22. Heated gas flowing by natural convection over the trailing edges causes the same to shrink against tube 22 and to form a thickened elastic [1] band thereabout. Those skilled in the art call this band a "tape." As upper portions of the film are heated the tape is drawn up over the top of tube 22, slips off this tube, and snaps against tube 23. Cooler gas (e.g., air at about room temperature) flowing through annular space 24 keeps the outer surface of tube 23 at a temperature substantially below (i.e., on the order of about 100° Fahrenheit lower) that of tube 22. Thus the shrinking elastic band is partially cooled as it shrinks against and is drawn up the tube 23. The shrunken elastic band nevertheless still retains a great amount of elasticity. Push rod 26 is then pushed upward by any suitable means. As illustrated this is accomplished by pressing lever extension 32 thus pivoting arm 30 about the hinge 31. The film edges shrunk against tube 23 are thereby drawn off of this tube and snap against the sides of container 25 forming a tight, close-fitting shrink cover. The container has been protected from any heat damage during the heat shrinking steps by means of relatively cool gas (e.g., room temperature air) in annular spaces 33 and 34.

For all practical purposes, essentially all parts of the apparatus of this invention can be constructed of ordinary sheet metal. Thus the invention provides inexpensive, easily constructed equipment for forming shrink covers. The tubes 22, 23 and 27 can be constructed to have a cross section of any shape suitable for accommodation of a container therein. Any of a wide variety of heating means, e.g., steam coils, radiant heaters, etc. can be used in lieu of the preferred electric resistance heaters described above. It is also feasible to use heating methods other than the preferred natural convection flow of heated gas so long as sufficient heat is supplied to raise the temperature of the film sufficiently to cause shrinkage thereof. It will be apparent that many means other than pivoted arm 30 and push rod 26 can be used for lifting container 25.

The apparatus and method of this invention can be used to cover any desired type of container. The invention is especially valuable in forming shrink covers over heat-sensitive (e.g., plastic) containers. Such containers are not affected because the film is first shrunk into a preformed tape and the preformed tape is partially cooled before it comes into contact with the container. It will be obvious that when the container is not heat-sensitive the cooling tube 23 and its related function can be eliminated.

In all cases, the pre-formation of an elastic band is essential to the method of this invention. This pre-formation allows one to obtain a shrink cover for containers having a wide variety of sizes and shapes. Even more importantly, a good shrink cover can be obtained even when the product is highly "mounded," i.e., projects to a height well above the height of the container side walls.

Another advantage of the process and apparatus of this invention is that the container contents, i.e., the product being packaged, is not heated to any significant degree at any time during formation of the shrink cover.

It is feasible, if desired, to form a hermetically sealed package using the method and apparatus of the invention. Thus, a layer of wax or other like sealing substance could be placed around the outside walls of the container, and the pre-formed tape snapped against this coating while it is still sufficiently hot to at least partially melt the same. Upon cooling, a tight seal between the tape and wax or other like heat activatable sealant would be formed. Similarly, hermetic seals can be formed on plastic trays by snapping into direct contact therewith a pre-formed tape still hot enough to cause a partial surface melting at the points of contact. On cooling, the two plastic materials will be tightly sealed together, thus giving a hermetically sealed cover over the container.

In general, there is employed in the invention polyethylene film or tubing which has been irradiated to an extent of 2 to 100 megarad, preferably 6 to 20 megarad. This irradiation can be accomplished in conventional fashion, e.g. by the use of a high voltage resonant transformer, such as the 2,000,000 volt General Electric transformer, or similar transformers of 50,000 to 50,000,000 volts or a Van de Graaff electron generator. In addition to the use of electrons there can be employed beta rays, gamma rays, e.g. by employing cobalt 60, etc. There can be employed any of the irradiation procedures disclosed in Baird et al. U.S. Patent 3,022,543 and Rainer et al. U.S. Patent 2,877,500, for example. The entire disclosures of the Baird and Rainer patents is hereby incorporated by reference.

The biaxial orientation is normally carried out to an extent of 100 to 700% longitudinally and 100 to 900% laterally. The biaxial stretching can be carried out by blowing irradiated polyethylene tubing as disclosed in the above Baird et al. patent. The irradiated biaxially oriented polyethylene prepared by such a procedure has a shrink energy of from 100 to 500 p.s.i. Films having this high shrink energy will shrink at least 20 percent in each direction when heated to 96° centigrade.

There can be employed as the starting polyethylene for the irradiation procedure high, low or medium density polyethylene prepared by low or high pressure technique. The starting polyethylene can have a molecular weight of 7,000 or 12,000 or 19,000 or 21,000 or 24,000 or 35,000 or, even higher.

In place of the irradiated polyethylene film there can be employed other high shrink energy biaxially oriented thermoplastic films such as the biaxially oriented polyvinyl chloride film sold commercially under the trade name "Reynolon."

It will be obvious to those skilled in the art that various changes may be made in the invention without departing from the spirit and scope thereof and therefore the invention is not limited by that which is illustrated in the drawing and described in the specification, but only as indicated in the accompanying claims.

I claim:
1. Method for forming a cover over the open side of a container comprising:
 (a) placing a sheet of heat-shrinkable high shrink energy biaxially oriented thermoplastic film over and beyond the peripheral lip of said open side;
 (b) heating the edges of said film sheet around substantially the entire periphery thereof while restraining said edges out of contact with the walls of said container;
 (c) continuing said heating for a period of time sufficient to shrink the film sheet edges into a thickened elastic band spaced apart from said peripheral lip;
 (d) moving the container against said film while discontinuing said edge restraint and snapping the preformed elastic band into tight engagement with and around the periphery of the container.

2. Method as defined in claim 1 including the additional step of at least partially cooling the pre-formed elastic band before snapping it onto the container.

3. Method as defined in claim 1 wherein said heat-shrinkable film is irradiated, biaxially oriented polyethylene film.

4. Method for forming a cover over the open side of a container comprising:
 (a) supporting said container, open side up, interiorly of a forming tube which extends around the periphery of said container;

---
[1] The term "Elastic" is used in its popular sense as possessing the properties of extensibility and retractibility associated with vulcanized rubber.

(b) placing a sheet of heat-shrinkable high shrink energy biaxially oriented thermoplastic film over the open side of said container and over and beyond the periphery of said forming tube;

(c) heating the edges of said film sheet around the entire periphery thereof;

(d) continuing said heating for a period of time sufficient to shrink the film sheet edges into a thickened elastic band around the forming tube;

(e) raising the container out of the forming tube, whereby said pre-formed elastic band snaps into tight engagement with and around the periphery of said container.

5. Method as defined in claim 4 including the additional step of at least partially cooling the pre-formed elastic band before snapping it onto the container.

6. Device for forming shrink covers comprising:
(a) means for supporting a container in a substantially fixed position;
(b) means for raising the container out of said supporting means;
(c) a hollow tube around said supporting means the upper opening of which is at a height not higher than the height of the upper edge of the container, said tube having a roughened surface on at least the upper part of its exterior surface area;
(d) an annular hollow chamber around the lower portion of said tube; and
(e) at least one heating means disposed so as to create natural convection flow of heated gas out of the upper opening of said hollow chamber.

7. Device for forming shrink covers comprising:
(a) a first hollow tube into which a container is loosely fitted;
(b) means in said first hollow tube for raising the container out of said tube;
(c) a second hollow tube concentric with the first tube and spaced therefrom so as to provide an annular space between the two tubes, said second tube terminating at a height not higher than the height of the upper edge of container and having a roughened surface on at least the upper part of its exterior surface area;
(d) an annular hollow chamber around the lower portion of said second tube;
(e) at least one heating means disposed within said hollow chamber to create natural convection flow of heated gas out of an upper opening thereof; and
(f) means for actuating said container raising means.

8. Device as defined in claim 7 wherein said container raising means comprises a push rod mounted for reciprocal movement in said first tube.

9. Device of claim 7 further including a third hollow tube between the first and second tubes with an annular space between all tubes, the upper part of the outer surface area of said third tube also being roughened.

10. Device of claim 9 wherein said roughened surface on the second and third tubes comprises a coating of aluminum oxide ($Al_2O_3$).

11. Device of claim 7 wherein said heating means comprise electric resistance heaters.

References Cited by the Examiner
UNITED STATES PATENTS
2,976,655   3/61   Dreyfus et al. _____ 53—42

TRAVIS S. McGEHEE, *Primary Examiner.*